(No Model.) 2 Sheets—Sheet 1.
R. D. GRAY.
PORTABLE PHOTOGRAPHIC CAMERA.
No. 346,199. Patented July 27, 1886.
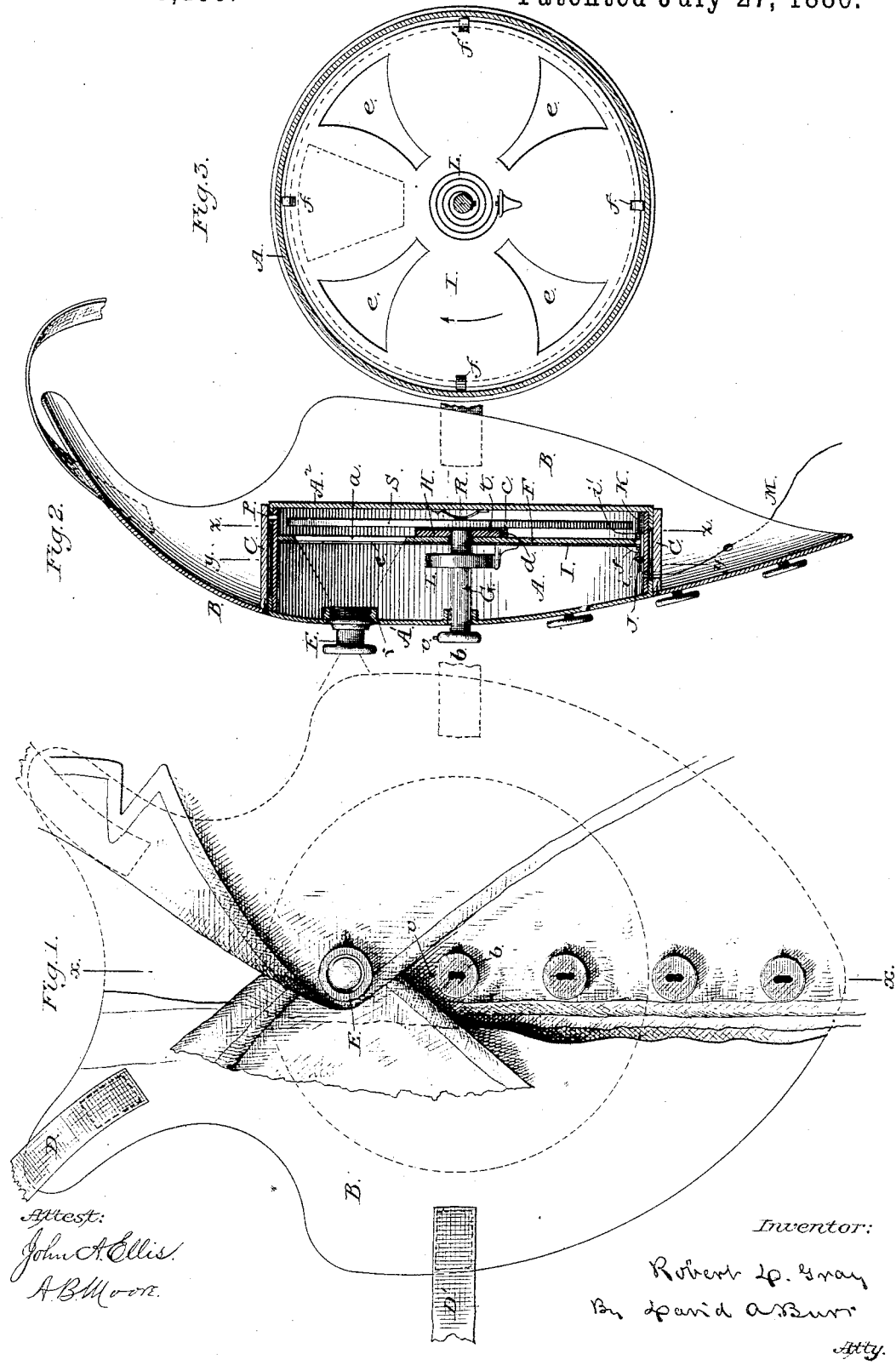

(No Model.) 2 Sheets—Sheet 2.

R. D. GRAY.
PORTABLE PHOTOGRAPHIC CAMERA.

No. 346,199. Patented July 27, 1886.

Attest:
John H. Ellis.
A. B. Moore.

Inventor:
Robert D. Gray
By David A. Burr
Atty.

UNITED STATES PATENT OFFICE.

ROBERT D. GRAY, OF NEW YORK, N. Y., ASSIGNOR OF ONE-THIRD TO JAMES H. FORD, OF SAME PLACE.

PORTABLE PHOTOGRAPHIC CAMERA.

SPECIFICATION forming part of Letters Patent No. 346,199, dated July 27, 1886.

Application filed September 15, 1885. Serial No. 177,166. (No model.)

*To all whom it may concern:*

Be it known that I, ROBERT D. GRAY, of the city, county, and State of New York, have invented a new and useful Improvement in Portable Photographic Cameras, to be carried concealed upon the person; and I do hereby declare that the following is a full and exact description thereof, reference being had to the accompanying drawings, and to the letters of reference marked thereon, making a part of this specification.

My invention relates to that class of portable photographic cameras which are designed to be carried upon the person, and has for its object to supply a camera which shall be wholly concealed under the clothing, and yet admit of being readily brought into proper focus for obtaining the image of an object or person. To this end I have constructed a camera, as hereinafter described, to be worn as a vest, concealed under the outer garments, the lens being brought to the center of the chest to facilitate directing it toward an object, and made to subserve the secondary purpose of a stud or button for the outer vest and coat, and thereby pass unobserved as a lens.

Figure 4:
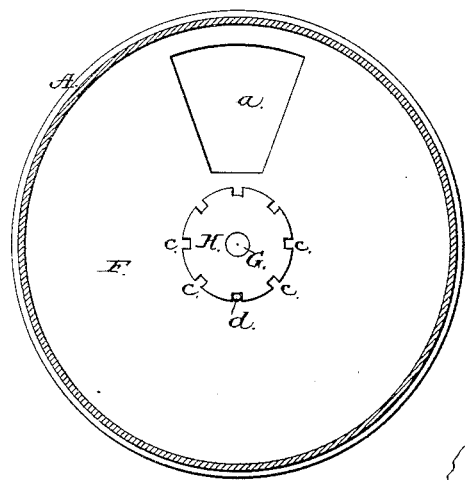
Figure 5:
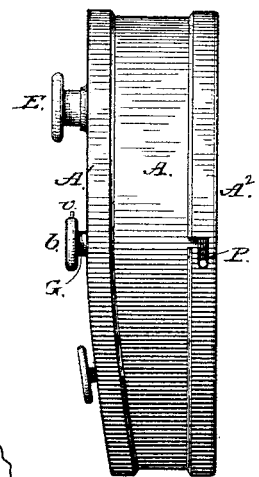
Figure 8:
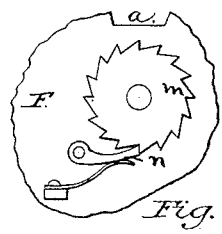
Figures 6, 7:
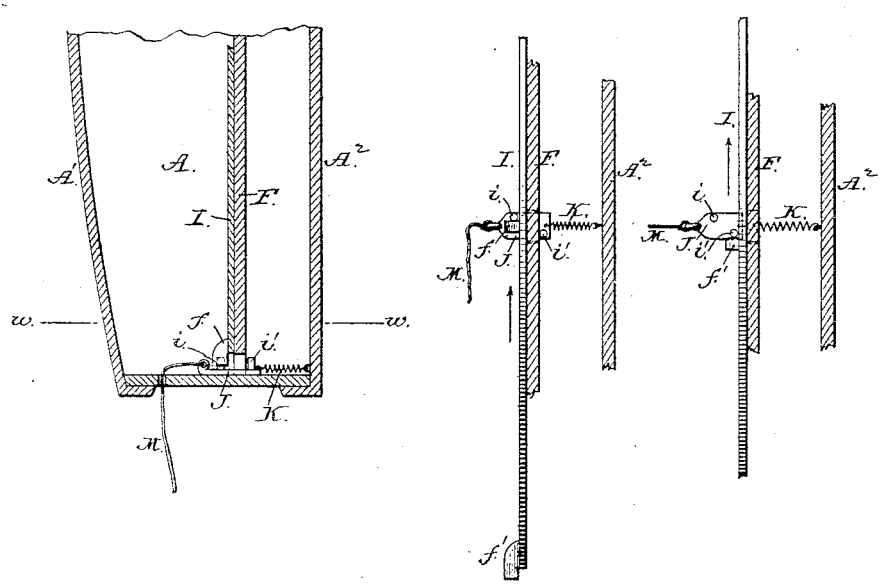

In the accompanying drawings, Figure 1 is a front elevation of my vest-camera in position upon the person, with the coat buttoned over upon the lens-button, and a portion of the coat and of the outer vest broken away to illustrate more fully the form of the inner vest containing the camera; Fig. 2, a central vertical transverse section of the camera and its vest in line *x x* of Fig. 1; Fig. 3, a diametric section in line *y y* of Fig. 2, showing the shutter and its spring in elevation; Fig. 4, a similar section in line *z z* of Fig. 2, illustrating the disk upon which the sensitized plate is supported; Fig. 5, a side elevation of the camera detached from the vest; Fig. 6, a detached sectional view, on an enlarged scale, of the slide by which the shutter is arrested; Fig. 7, similar detached plan views of said slide in two positions thereof, and Fig. 8 a detached view of a pawl or ratchet to be employed as an equivalent of the notched disk and pin controlling the movement of the shutter-spindle.

A represents the casing of the camera, preferably cylindrical or polygonal in form; B B, a shell of card-board or other light stiff material capable of being molded into form and retaining its shape permanently, fashioned to fit as a vest against the shoulders and over the chest, with an outward swell sufficient to allow of the insertion under it of the casing of the camera, and by its contour effectually conceal the same. In the center of this shell or camera-vest an opening is formed, and is fitted with a casing, C, to receive and firmly hold the camera A in such position relatively to the neck and shoulders of the person wearing the vest as that the lens-tube of the camera placed in said casing C shall project outward at the point at which the lapels of the coat are usually buttoned at the top. The camera-vest B is secured over the chest by means of straps or bands D D', adapted to be fastened, respectively, around the neck and around the back of the wearer. The front plate, A', of the camera, is curved to conform to the configuration of the camera-vest. The lens-tube E is fitted to screw into a plate, *r*, fitted centrally in the upper portion of this front plate, A', and is made of a length to project outwardly therefrom far enough to serve as a button-shank upon which the upper button-hole in an ordinary vest (if it be cut high) and the button-holes in the lapel of the coat worn over the camera-vest may be buttoned. The outer end of the tube E is finished in imitation of a button, with the lens as a central piece therein. While the lower portion and the sides of the camera-vest are hidden by the ordinary vest and coat of the wearer, the central portion above the opening may be concealed by a "dickey" or false shirt-bosom, or by a cravat or scarf, so that the entire apparatus is effectually concealed, the exposed lens having the appearance of a coat-button with a crystalline center, which, when the camera is not in use, may be further covered with a cap resembling the ordinary buttons of a coat.

The camera-box A, necessarily made shallow, is divided into two compartments by a partition, F, secured therein at right angles to the lens-tube E, and through it a segmental opening, *a*, (see Fig. 4,) is made in front of the tube, of a size to permit the rays of light focalized by the lens to fall upon a sensitized plate placed back of the partition. A central spindle, G, is fitted to rotate in bearings in the front plate, A', and partition F, and to project through the front plate far enough to receive a button-head, b, which is made to correspond in appearance with the buttons of the vest and serve as a substitute for one of said buttons. A polygonal or circular disk or plate, H, is made fast to the inner end of the spindle G, parallel with the partition F in close proximity thereto. The periphery of the plate or disk is formed with a series of notches, c c c, therein, (see Fig. 4,) corresponding to the number of views which may be taken upon a single sensitized plate, and which is determined by the size of the field covered by the opening in the partition F. The spindle G is allowed to have a slight longitudinal play in its bearings, sufficient to carry the notches c c in the periphery of the disk H into and out of engagement with a pin, d, projecting slightly from the partition. A thin plate or shutter, I, is fitted to rotate loosely upon the spindle G, on the outer side of the partition F, and in close proximity thereto, its diameter being such as to cause its periphery to extend out over the opening a in the partition and cover the same. A series of segmental openings, e e e e, each of dimensions slightly smaller than that in the partition, and formed, preferably, with inwardly-curved sides, (see Fig. 3,) are cut in the shutter I, so as to register with the opening a in the partition. When one of the intervals between these openings e e is brought into register with the opening a, to cover and close the same, the revolution of the shutter is arrested by means of a stop or lug, f, projecting from its periphery, to engage a pin, i, upon a slide, J, fitted to move transversely to the edge of the shutter, and which is governed by a spring, K, operating to draw the pin i into position to engage the stop f. The stop f is held against the pin i, and the shutter is made to revolve automatically in that direction when the pin is withdrawn by the tension of a helical spring, L, (see Figs. 2 and 3,) encircling the spindle G next to the shutter, and of which one end is made fast to the shutter and the other to the spindle; hence by rotating the spindle by means of its head or button b the spring is wound up, the shutter being held by the pin i, and when wound up upon the spindle is held fast by the engagement of its disk H with the pin d. I contemplate the use of a ratchet, m, and pawl n, (see Fig. 8,) as an equivalent for the notches c c on the disk H and the pin d, to prevent a reverse movement of the spindle G when the spring L has been wound up thereby.

The slide J, (see Figs. 2 and 6,) is operated by means of a cord, M. When it is drawn out to release its pin i from engagement with the stop or lug f on the shutter, a second pin, i', is brought into register with the periphery of the shutter, so as to be engaged by the next stop or lug f thereon. As the first pin, i, upon the slide is in advance of the second pin, i', when the slide is released to fly back under the tension of its spring L, the pin i will be disengaged from the lug f, but the pin i' will instantly move into line to engage the lug, and thus hold the shutter until the outward movement of the slide again releases it. The number of lugs or stops f f' corresponds to the number of openings e e in the shutter, (see Fig. 3,) and they are placed intermediate said openings, so that an opening, e, in the shutter is carried over the face of the opening a in the partition at each movement of the slide.

The rear plate, A², of the camera is made detachable therefrom, and is secured in place by means of angular slots P P upon its edge, engaging pins projecting from the casing A. (See Fig. 5.) A plate-spring, R, is fitted centrally upon the inner face of the plate A², so that its central portion shall project in a curve and bear with an elastic pressure against the center of the disk H without interfering with its rotation. This spring serves to hold against said disk H the interposed sensitized plate S, to be used in the camera, and will confine the plate upon the disk, so that it shall rotate therewith, and yet admit of being readily removed therefrom. To obtain such a close frictional contact of the plate S and disk H as shall cause them to revolve in unison, I face the disk with a lining, t, of rubber or felt. The head or button b upon the outer end of the spindle G is provided with an index-pin, v, projecting radially therefrom, to indicate the position of the plate carried by the spindle.

In the use and operation of my improved camera a sensitized plate, S, is fitted upon the disk H and secured thereon to be free to revolve therewith by fastening the plate A² upon the back of the camera, whereupon its spring R will bear centrally upon the plate. (See Fig. 2.) The camera-vest B B, carrying the camera A, is then suspended over and upon the chest of the operator by means of the straps or bands D, fastened around the neck, and is secured firmly in place by the back straps or bands D'. The ordinary vest is then put on and its upper button-holes fastened over the button-head b of the spindle, (which is made to match the remaining buttons,) and, if the vest be high enough, over the end of the lens-tube E also. The portion of the camera-vest B B above the lens-tube is concealed by the scarf of the operator or by a false shirt-front or dickey suspended from the neck. The coat is now put on and buttoned at the top upon the lens-tube, which, from its central position upon the chest, may be readily directed toward any desired object without attracting attention. By pushing in and turning the button b, the spindle G is rotated, thereby winding up the spring L, attached thereto at one end, the opposite end of the spring, with the shutter to which it is secured, being held fast by the stop f, engaging the pin i on the slide J, the position of any given point upon the sensitized plate being indicated by the position of the index-pin v on the button. So soon as the hold upon the button is released, the spring R, forcing the disk H inward, will cause the pin $d$ to engage one of the notches $c$ on the periphery of the disk, and thereby hold the spindle fast. From the position of the stop $f$ on the shutter I the shutter will, when at rest, cover the opening $a$ in the partition F over the plate S, so that the plate remains protected from the light even when the lens is uncovered. The camera being now ready for use, with a portion of the sensitized plate S in position under the opening $a$ facing the lens, the opening covered and closed by the shutter I, the spring L, to actuate the shutter, wound up in readiness to move it, and the movement of the shutter restrained by the slide J, the lens may be readily directed toward the object to be photographed by the operator, who, standing erect, need only to face the object directly. The proper focal distance is readily adjusted by screwing the lens-tube E in or out of its plate $r$, a very slight movement being sufficient for the purpose. At the proper moment the operator, by pulling the string M, will move the slide J and release the shutter, which will then revolve one-quarter turn, or until the next stop, $f'$, thereon strikes the pin $i$ of the slide. During this movement of the shutter the opening $e$ therein will pass over the opening $a$ in the partition under the lens, affording a momentary exposure of the plate S, sufficient to obtain an impression of the object. By pressing in the button $b$ and turning it the plate S may now be turned to bring a fresh surface under the lens E, the position of the first impression being determined by the index-pin $v$. In thus turning the plate the spring L is rewound to a corresponding extent, and the apparatus is in readiness for taking a second impression.

It is evident that the lower portion of the shell B below the lens-tube E may be in itself finished in imitation of a vest.

I claim as my invention—

1. The combination, with a shell or vest constructed, substantially as described, to fit over and upon the chest of the wearer, of a photographic camera secured to the vest for support and adjustment upon the person, substantially in the manner and for the purpose herein set forth.

2. The combination, with a coat-button, of a lens fitted in the button, a cylindrical tube for the lens serving as a shank for the button, and a camera constructed, substantially as described, to fit upon the chest of the wearer, and to which the tube is secured, whereby the button is supported in position to engage the lapels of the coat worn over the chest.

3. The combination, with a vest-camera constructed, substantially as described, to fit upon the chest of the wearer, and with a lens-tube and lens secured to the front thereof, of a partition within the camera at right angles to the length of the tube, provided with an opening therein in front of the tube, a spring-actuated shutter mounted to revolve between the tube and partition in close proximity to the latter, a central spindle extending through the partition, and serving as an axis upon which the shutter revolves loosely in front thereof, a disk or plate fitted upon said spindle to serve as a bearing for the sensitized plate, and a spring operating to hold the sensitized plate against said bearing, substantially in the manner and for the purpose herein set forth.

4. The combination, with a photographic vest-camera, a perforated transverse partition within the camera, and a revolving shutter fitted in front of said partition, of a central spindle rotating in bearings in the front plate and partition of the camera and projecting outwardly therefrom, a helical spring secured at one end to the shutter, and at the other to the spindle to be wound up by the rotation of the latter, a movable catch engaging stops upon the shutter to arrest and limit its movement when actuated by the spring, and a device, substantially as described, for preventing a reverse movement of the spindle, substantially in the manner and for the purpose herein set forth.

5. The combination, with the vest-camera A, its revolving shutter I, and a spring, L, actuating said shutter, of a spring-actuated slide, J, pins $i\ i'$ upon said slide, and stops $f f'$, projecting from the periphery of the shutter to engage said pins, substantially in the manner and for the purpose herein set forth.

In testimony whereof I have signed my name to this specification in the presence of two subscribing witnesses.

ROBERT D. GRAY.

Witnesses:
J. F. ACKER, Jr.,
A. B. MOORE.